US010793327B2

(12) United States Patent
Weimer et al.

(10) Patent No.: US 10,793,327 B2
(45) Date of Patent: Oct. 6, 2020

(54) LYOPHILIZATION CONTAINER AND METHOD OF USING SAME

(71) Applicant: Terumo BCT Biotechnologies, LLC, Lakewood, CO (US)

(72) Inventors: Kirk L. Weimer, Green Valley, AZ (US); Nate T. Johnson, Highlands Ranch, CO (US); Dennis J. Hlavinka, Arvada, CO (US); Kestas P. Parakininkas, Englewood, CO (US)

(73) Assignee: Terumo BCT Biotechnologies, LLC, Lakewood, CO (US)

( * ) Notice: Subject to any disclaimer, the term of this patent is extended or adjusted under 35 U.S.C. 154(b) by 0 days.

(21) Appl. No.: 16/154,976

(22) Filed: Oct. 9, 2018

(65) Prior Publication Data

US 2019/0106254 A1    Apr. 11, 2019

Related U.S. Application Data

(60) Provisional application No. 62/569,858, filed on Oct. 9, 2017, provisional application No. 62/571,087, filed on Oct. 11, 2017.

(51) Int. Cl.
*B65D 51/24* (2006.01)
*F26B 5/06* (2006.01)
(Continued)

(52) U.S. Cl.
CPC ......... *B65D 51/241* (2013.01); *A01N 1/0263* (2013.01); *A01N 1/0284* (2013.01);
(Continued)

(58) Field of Classification Search
CPC ..... F26B 5/00; F26B 5/06; F26B 3/30; B65D 21/241; A61J 1/1468; A61J 1/10; A01N 1/0263; A01N 1/0284; A01N 1/0289
(Continued)

(56) References Cited

U.S. PATENT DOCUMENTS 1,441,570 A    1/1923    Fitzgerald
1,504,225 A    8/1924    Fitzgerald
(Continued)

FOREIGN PATENT DOCUMENTS

DE    2617742 A1    6/1977
DE    19729778 A1    1/1999
(Continued)

OTHER PUBLICATIONS

US 8,359,766 B2, 01/2013, Hubbard, Jr. et al. (withdrawn)
(Continued)

*Primary Examiner* — Stephen M Gravini
(74) *Attorney, Agent, or Firm* — Terumo BCT, Inc. IP Law Department

(57) ABSTRACT

Provided is a multi-part lyophilization container for lyophilizing a fluid, storing the lyophilizate, reconstituting the lyophilizate, and infusing the reconstituted lyophilizate into a patient, including a method of using same. The container includes a front surface, a back surface, a non-breathable section including a port region, a breathable section including a breathable membrane, and an occlusion zone encompassing a boundary between the non-breathable section and the breathable section. The non-breathable section is configured to accommodate any of a liquid, a solid, a gas or combination thereof. The breathable section is configured to accommodate only a gas. The method includes creating a temporary seal between the non-breathable section of the container and the breathable section, inputting a liquid into the non-breathable section, freezing the liquid, removing the temporary seal to allow vapor transport between the non-breathable section and the breathable section, and adding heat energy the frozen liquid under vacuum.

28 Claims, 9 Drawing Sheets

(51) Int. Cl.
*A61J 1/14* (2006.01)
*A61J 1/10* (2006.01)
*A01N 1/02* (2006.01)
*F26B 25/06* (2006.01)
*A61J 1/20* (2006.01)

(52) U.S. Cl.
CPC .............. *A01N 1/0289* (2013.01); *A61J 1/10* (2013.01); *A61J 1/1468* (2015.05); *F26B 5/06* (2013.01); *F26B 25/063* (2013.01); *A61J 1/2093* (2013.01)

(58) Field of Classification Search
USPC .......................................................... 34/284
See application file for complete search history.

(56) References Cited

U.S. PATENT DOCUMENTS

| | | | |
|---|---|---|---|
| 2,704,075 A | 3/1955 | Cherkin |
| 2,767,117 A | 10/1956 | Crawley |
| 3,187,750 A | 6/1965 | Tenczar |
| 3,229,813 A | 1/1966 | Crowe, Jr. et al. |
| 3,247,957 A | 4/1966 | Kemble |
| 3,375,824 A | 4/1968 | Krakauer et al. |
| 3,466,249 A | 9/1969 | Anderson |
| 3,468,471 A | 9/1969 | Linder |
| 3,537,189 A | 11/1970 | Bender et al. |
| 3,571,940 A | 3/1971 | Bender |
| 3,574,950 A | 4/1971 | Dantoni |
| 3,607,858 A | 9/1971 | Querry et al. |
| 3,945,523 A | 3/1976 | Wertlake et al. |
| 3,964,865 A | 6/1976 | Das |
| 4,001,944 A | 1/1977 | Williams |
| 4,035,924 A | 7/1977 | Faure |
| 4,056,484 A | 11/1977 | Heimburger et al. |
| 4,109,396 A | 8/1978 | Fraser |
| 4,134,943 A | 1/1979 | Knitsch et al. |
| 4,218,321 A | 8/1980 | Sasaki et al. |
| 4,650,678 A | 3/1987 | Fuhge et al. |
| 4,664,913 A | 5/1987 | Mielke et al. |
| 4,730,460 A | 3/1988 | Coelho et al. |
| 4,813,210 A | 3/1989 | Masuda et al. |
| 4,874,690 A | 10/1989 | Goodrich, Jr. et al. |
| 4,902,287 A | 2/1990 | Carmen et al. |
| 4,904,641 A | 2/1990 | Eibl et al. |
| 4,973,327 A | 11/1990 | Goodrich, Jr. et al. |
| 4,994,057 A | 2/1991 | Carmen et al. |
| 5,043,261 A | 8/1991 | Goodrich et al. |
| 5,045,446 A | 9/1991 | Goodrich, Jr. et al. |
| 5,059,036 A | 10/1991 | Richison et al. |
| 5,114,004 A | 5/1992 | Isono et al. |
| 5,171,661 A | 12/1992 | Goodrich, Jr. et al. |
| 5,178,884 A | 1/1993 | Goodrich et al. |
| 5,213,814 A | 5/1993 | Goodrich, Jr. et al. |
| 5,257,983 A | 11/1993 | Garyantes et al. |
| 5,309,649 A | 5/1994 | Bergmann et al. |
| 5,340,592 A | 8/1994 | Goodrich, Jr. et al. |
| 5,425,951 A | 6/1995 | Goodrich, Jr. et al. |
| 5,514,123 A | 5/1996 | Adolf et al. |
| 5,551,781 A | 9/1996 | Wilkes et al. |
| 5,648,206 A | 7/1997 | Goodrich, Jr. et al. |
| 5,656,498 A | 8/1997 | Iijima et al. |
| 5,759,774 A | 6/1998 | Hackett et al. |
| 5,849,473 A | 12/1998 | Cabrera et al. |
| 5,853,388 A | 12/1998 | Semel |
| 5,946,931 A | 9/1999 | Lomax et al. |
| 6,007,529 A | 12/1999 | Gustafsson et al. |
| 6,132,454 A | 10/2000 | Fellows |
| 6,148,536 A | 11/2000 | Iijima |
| 6,199,297 B1 | 3/2001 | Wisniewski |
| 6,221,575 B1 | 4/2001 | Roser et al. |
| 6,381,870 B1 | 5/2002 | Kohlman et al. |
| 6,398,771 B1 | 6/2002 | Gustafsson et al. |
| 6,517,526 B1 * | 2/2003 | Tamari .............. A01N 1/0236 604/403 |
| 6,608,237 B1 | 8/2003 | Li et al. |
| 6,773,425 B1 | 8/2004 | Tamari |
| 6,869,901 B2 | 3/2005 | Lubker, II |
| 6,981,337 B2 | 1/2006 | Jones et al. |
| 7,048,709 B2 | 5/2006 | Goudaliez et al. |
| 7,175,614 B2 | 2/2007 | Gollier et al. |
| 7,179,951 B2 | 2/2007 | Krishnaswamy-Mirle et al. |
| 7,202,341 B2 | 4/2007 | McGinnis et al. |
| 7,249,880 B2 | 7/2007 | Zambaux |
| 7,363,726 B2 * | 4/2008 | Wang .................. F26B 5/06 34/286 |
| 7,422,726 B2 | 9/2008 | Hammerstedt et al. |
| 7,435,795 B2 | 10/2008 | McGinnis et al. |
| 7,473,246 B2 | 1/2009 | Vancaillie et al. |
| 7,618,406 B2 | 11/2009 | Roger |
| 7,776,022 B2 * | 8/2010 | McCarthy .............. A61J 1/10 604/403 |
| 7,931,919 B2 | 4/2011 | Bakaltcheva et al. |
| 7,966,746 B2 | 6/2011 | Py |
| 8,013,022 B2 * | 9/2011 | DeAngelo .............. A61J 1/10 514/772 |
| 8,053,248 B2 * | 11/2011 | Bakaltcheva ............ A01N 1/02 34/284 |
| 8,057,872 B2 | 11/2011 | Chen |
| 8,097,403 B2 | 1/2012 | Ho et al. |
| 8,235,965 B2 | 8/2012 | Roger |
| 8,372,343 B2 | 2/2013 | Goldstein |
| 8,449,520 B2 | 5/2013 | Pepper et al. |
| 8,491,178 B2 | 7/2013 | Breidenthal et al. |
| 8,492,081 B2 | 7/2013 | Nichols et al. |
| 8,512,754 B2 | 8/2013 | Needham |
| 8,516,714 B2 | 8/2013 | Biemans et al. |
| 8,518,452 B2 * | 8/2013 | Bjornstrup .......... A61K 9/0019 424/530 |
| 8,603,063 B2 | 12/2013 | Grimm |
| 8,858,681 B2 | 10/2014 | Harp |
| 9,046,303 B2 | 6/2015 | Yagi |
| 9,161,527 B2 | 10/2015 | Cutting et al. |
| 9,469,835 B2 * | 10/2016 | Bronshtein .......... A01N 1/0284 |
| 9,545,379 B2 | 1/2017 | Liu et al. |
| 9,561,184 B2 | 2/2017 | Khan et al. |
| 9,561,893 B2 * | 2/2017 | Root .................. B65D 81/245 |
| 9,863,699 B2 * | 1/2018 | Corbin, III ................ F26B 5/06 |
| 9,863,701 B2 * | 1/2018 | Robinson ................ F26B 5/065 |
| 10,377,520 B2 * | 8/2019 | Root ...................... B65B 3/003 |
| 10,492,507 B2 * | 12/2019 | Rizvi .................. A23L 3/3544 |
| 10,507,165 B2 | 12/2019 | Di Naro |
| 10,539,367 B2 | 1/2020 | Corbin, III et al. |
| 2002/0035354 A1 | 3/2002 | Mirle et al. |
| 2003/0065149 A1 | 4/2003 | McGinnis et al. |
| 2004/0081588 A1 | 4/2004 | Hammerstedt et al. |
| 2006/0216687 A1 | 9/2006 | Alves-Filho et al. |
| 2006/0263759 A1 | 11/2006 | Alves-Filho et al. |
| 2008/0256822 A1 | 4/2008 | Suzuki et al. |
| 2008/0119818 A1 * | 5/2008 | Bakaltcheva .......... A01N 1/02 604/403 |
| 2008/0206293 A1 | 8/2008 | Toreki et al. |
| 2008/0234653 A1 | 9/2008 | McCarthy et al. |
| 2008/0234654 A1 * | 9/2008 | McCarthy .............. A61J 1/10 604/416 |
| 2008/0249499 A1 | 10/2008 | Vancaillie et al. |
| 2009/0036862 A1 | 2/2009 | Grimm |
| 2009/0107001 A1 | 4/2009 | McCarthy |
| 2009/0113753 A1 | 5/2009 | Pepper et al. |
| 2009/0223080 A1 | 9/2009 | McCarthy et al. |
| 2009/0324929 A1 | 12/2009 | Yamakawa et al. |
| 2010/0049156 A1 | 2/2010 | Dickhorner et al. |
| 2010/0159023 A1 * | 6/2010 | Bjornstrup .......... A61K 9/0019 424/530 |
| 2011/0114524 A1 | 5/2011 | Eibl |
| 2011/0144613 A1 | 6/2011 | Pepper et al. |
| 2011/0183311 A1 | 7/2011 | Ho et al. |
| 2011/0282325 A1 | 11/2011 | Gregory |
| 2012/0231485 A1 | 9/2012 | Önundarson et al. |
| 2013/0326899 A1 | 12/2013 | Yagi |
| 2014/0178513 A1 * | 6/2014 | Matthews ............ B29C 48/475 425/6 |
| 2014/0212895 A1 | 7/2014 | Lim |

(56) References Cited

U.S. PATENT DOCUMENTS

| | | |
|---|---|---|
| 2014/0259724 A1 | 9/2014 | McCarthy et al. |
| 2014/0287643 A1 | 9/2014 | Nozaki et al. |
| 2014/0360891 A1 | 12/2014 | Kline et al. |
| 2015/0158652 A1* | 6/2015 | Root .................. B65D 81/245 206/438 |
| 2015/0354894 A1* | 12/2015 | Corbin, III ............. F26B 5/06 34/296 |
| 2016/0084572 A1 | 3/2016 | Khan et al. |
| 2016/0375184 A1 | 12/2016 | Albert et al. |
| 2017/0100339 A1 | 4/2017 | Liu et al. |
| 2017/0113824 A1 | 4/2017 | Root et al. |
| 2017/0203871 A1 | 7/2017 | Murto et al. |
| 2017/0259186 A1 | 9/2017 | Khan et al. |
| 2018/0128544 A1 | 5/2018 | Corbin, III et al. |
| 2019/0106254 A1* | 4/2019 | Weimer ............... A01N 1/0263 |
| 2019/0142694 A1 | 5/2019 | Di Naro |

FOREIGN PATENT DOCUMENTS

| | | | |
|---|---|---|---|
| EP | 0284249 A1 | 9/1988 | |
| EP | 0335682 A1 | 10/1989 | |
| EP | 0343596 B1 | 11/1989 | |
| EP | 2729932 A1 | 8/1996 | |
| EP | 1087990 B1 | 9/2004 | |
| EP | 1958618 A1 | 8/2008 | |
| EP | 2431024 A1 * | 3/2012 | ............ A61K 47/12 |
| EP | 1407780 B1 | 5/2013 | |
| GB | 450146 A | 7/1936 | |
| GB | 748784 A | 5/1956 | |
| GB | 814491 A | 6/1959 | |
| GB | 1206033 A | 9/1970 | |
| GB | 1486787 A | 9/1977 | |
| JP | H63-036828 A | 2/1988 | |
| JP | 2014028661 A | 2/2014 | |
| WO | 95/27180 A1 | 10/1995 | |
| WO | 96/29556 A1 | 9/1996 | |
| WO | 96/31748 A1 | 10/1996 | |
| WO | 00/36353 A1 | 6/2000 | |
| WO | 2006000422 A1 | 1/2006 | |
| WO | 2006028648 A2 | 3/2006 | |
| WO | 2006028648 A3 | 1/2007 | |
| WO | 2007104760 A2 | 9/2007 | |
| WO | 2008115548 A2 | 9/2008 | |
| WO | 2008130602 A1 | 10/2008 | |
| WO | 2010019217 A1 | 2/2010 | |
| WO | 2010033169 A1 | 3/2010 | |
| WO | 2010093429 A1 | 8/2010 | |
| WO | 2013062479 A1 | 5/2013 | |
| WO | 2014033228 A1 | 3/2014 | |
| WO | 2014165222 A1 | 10/2014 | |
| WO | 2015191599 A2 | 12/2015 | |
| WO | WO-2015191599 A3 * | 4/2016 | ............... F26B 5/06 |
| WO | WO-2019074886 A1 * | 4/2019 | ............... F26B 5/06 |

OTHER PUBLICATIONS

Cannon, Jeremy W. M.D., "Prehospital Damage-Control Resuscitation", The New England Journal of Medicine, Jul. 26, 2018, pp. 387-388.

Cherry, Chris, "Containment systems for freeze-drying," ISL-FD, Sep. 7, 2015.

Cherry, Christopher Lee Albert, "Development of Novel Containment Systems for Freeze-Drying," a thesis submitted to Cardiff Metropolitan University, Apr. 10, 2013.

Glassberg et al, "Freeze-dried Plasma at the Point of Injury: from Concept to Doctrine", SHOCK, Dec. 2013, vol. 40, No. 6, pp. 444-450.

International Search Report and Written Opinion, PCT/US2018/054943, dated Jan. 25, 2019.

Pan et al, "Study of Banana Dehydration Using Sequential Infrared Radiation Heating and Freeze-Drying", LWT—Food Science and Technology, 2008 v. 41, pp. 1944-1951.

Soares, Jeffrey M., "Saving Lives with Freeze-dried Plasma", The United States Army, Nov. 27, 2017, pp. 1-5. https://www.army.mil/article/197409.

Sperry et al, "Prehospital Plasma during Air Medical Transport in Trauma Patients at Risk for Hemorrhagic Shock", The New England Journal of Medicine, Jul. 26, 2018, pp. 315-326.

\* cited by examiner

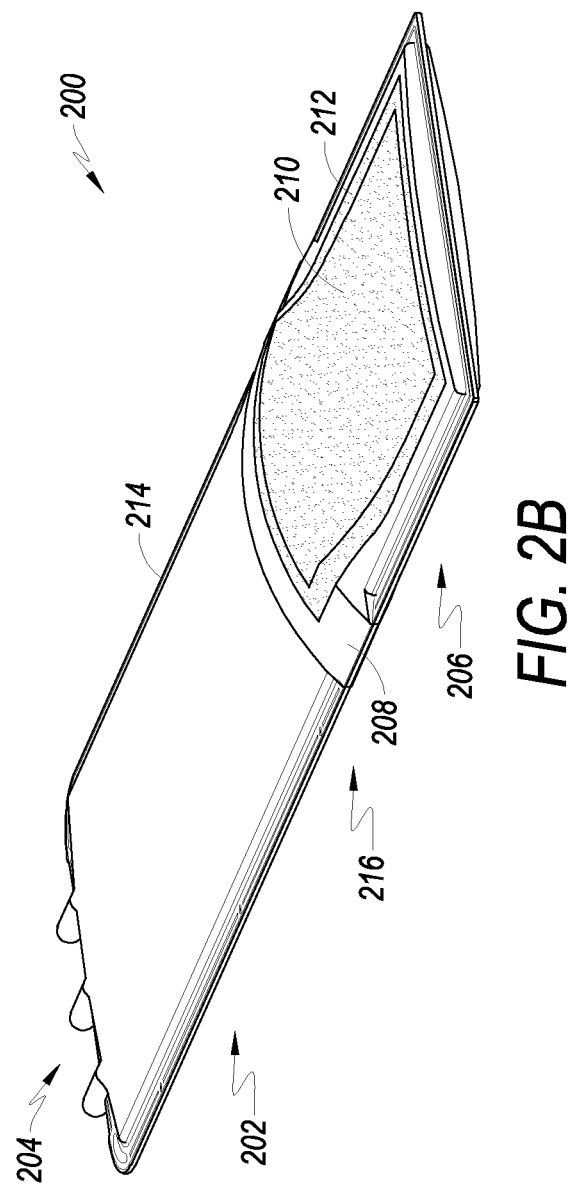

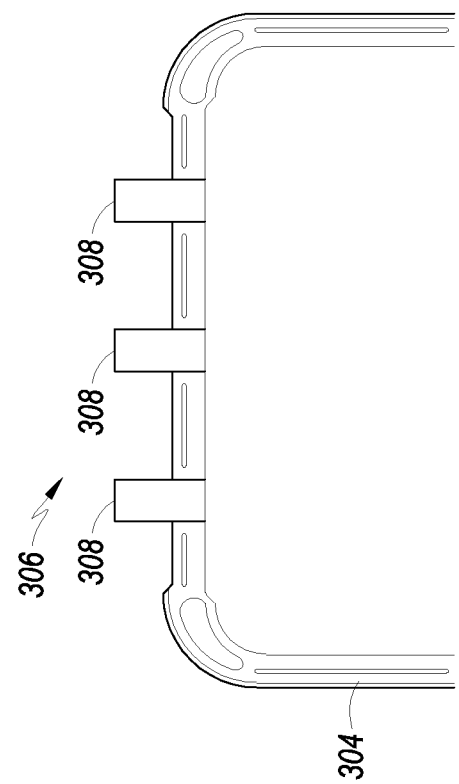
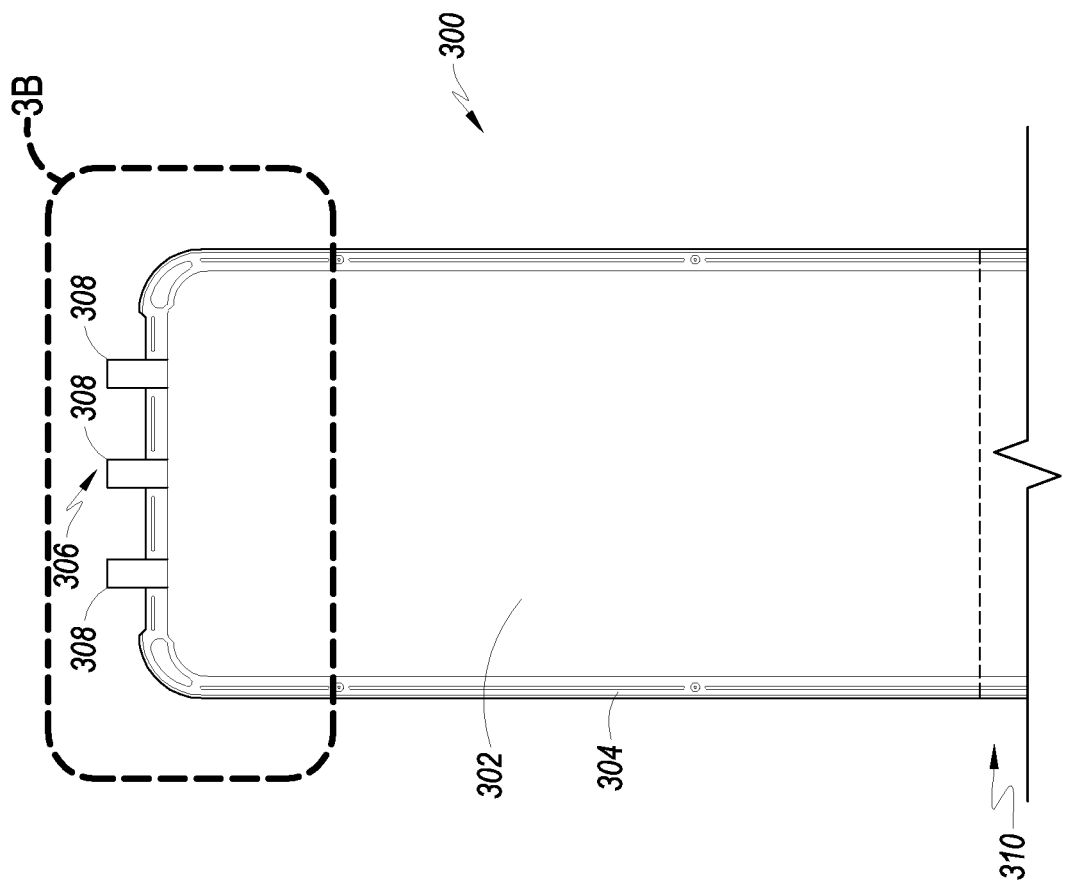
FIG. 3A
FIG. 3B

LYOPHILIZATION CONTAINER AND METHOD OF USING SAME

This application claims priority to each of U.S. Provisional Patent Application No. 62/569,858, entitled "Lyophilization and Storage Container for Freeze Dried Blood Products," filed in the U.S. Patent and Trademark Office on Oct. 9, 2017 and U.S. Provisional Patent Application No. 62/571,087, entitled "Lyophilization and Storage Container for Freeze Dried Blood Products," filed in the U.S. Patent and Trademark Office on Oct. 11, 2017, each of which are incorporated by reference herein in their entirety.

The invention was made with government support under contract number H92222-16-C-0081 awarded by the United States Department of Defense. The government has certain rights in the invention.

BACKGROUND

The present application describes a device and related method for lyophilizing (freeze-drying) and storing a fluid. The device is a continually evolving, multi-section lyophilization container that evolves throughout the stages of filling, lyophilization, storage, reconstitution and infusion. The method is a means by which the device is manipulated throughout the lyophilization process. In embodiments of the instant application, lyophilization of the fluid occurs in situ within the multi-section lyophilization container.

Any suitable fluid may be lyophilized and stored using the devices and techniques described in this disclosure, including human and animal blood and related blood products, such as blood plasma.

The advantages of lyophilization and the relative benefits of storing and transporting lyophilized products have been known for many years. Unfortunately, several technical challenges must be addressed before lyophilization can enjoy greater adoption in the blood and blood related fields. One such challenge is that many methods use glass containers which tend to be large and breakable. In this respect, a flexible pouch would be an improvement. Further, current methods suffer from prolonged drying times resulting from restricted vapor transmission to the condenser of the lyophilizer. Another challenge is that current lyophilization techniques include pathways by which both the blood, and the technician, may be subject to contamination. A yet further challenge, specific to techniques utilizing a flexible container including a breathable membrane, is a limitation in vapor flow caused by a wetting and fouling (i.e., blocking) of the breathable membrane throughout the lyophilization process which leads to relatively slow lyophilization times. Additionally, current devices include an arrangement of breathable and non-breathable elements which fails to provide adequate total breathable surface area, resulting in underperformance.

Because of these and other problems associated with the state of the art, the traditional approach to freezing, storing and transporting frozen blood and blood products remains the approach most commonly deployed. Problematically, traditional freezing, storage and transportation of blood and blood products requires the blood to be maintained at a temperature that is typically −20° C. or below to maintain protein integrity. This, in turn, necessitates cold chain management which dramatically increases the costs and logistical hurdles associated with traditional methods. For example, cold chain management requires the implementation of systems and protocols capable of effectively processing orders and providing reliable transportation and delivery of frozen products that then require thawing prior to transfusion. These requirements can present significant challenges in developing regions suffering from lack of resources and lack of infrastructure capable of accommodating the complex requirements of the cold chain logistics just described. Often, the result is that patients in dire need of transfusion in developing regions perish. Accordingly, despite their predominance, traditional methods remain burdened by disadvantages, particularly in connection with blood requiring storage for long periods or requiring temperature-controlled transportation over large distances.

Consequently, a strong interest remains in lyophilization as an alternative to traditional methods for freezing, storing and transporting blood and blood products. A lyophilized blood product, such as plasma, may have much smaller mass than a traditional product, has a longer shelf life and does not require extensive cold chain management or lengthy thawing procedures. Additionally, since a lyophilized blood product can be easily and rapidly reconstituted at its point of use, a lyophilized blood product is often preferable in battlefield environments, in emergency response situations and in various clinical applications. For these and other reasons, there remains a need to improve current lyophilization devices and techniques in relation to blood and blood products.

Although specific embodiments of the present application are provided in view of these and other considerations, the specific problems discussed herein should not be interpreted as limiting the applicability of the embodiments of this disclosure in any way.

SUMMARY

This summary is provided to introduce aspects of some embodiments of the present application in a simplified form and is not intended to comprise an exhaustive list of all critical or essential elements of the claimed invention, nor is it intended to limit the scope of the claims.

Embodiments provide for a multi-part lyophilization container. The container includes a front surface, a back surface, a non-breathable section including a port region, a breathable section including a breathable membrane, and an occlusion zone encompassing a boundary bridging the non-breathable section and the breathable section. The non-breathable section is configured to accommodate any of a liquid, a solid and a gas, whereas the breathable section is configured to accommodate only a gas.

In another aspect, provided is a method of lyophilizing a fluid in a multi-part container. The method includes creating a temporary seal dividing a non-breathable section of the container and a breathable section of the container, inputting a liquid into the non-breathable section of the container, freezing the liquid, opening the temporary seal to allow vapor flow between the non-breathable section of the container and the breathable section of the container, and adding heat energy to the frozen liquid under vacuum, wherein the breathable section is configured to accommodate only a gas.

Further embodiments of the present application include additional methods and devices and systems for lyophilizing fluids. The fluid may be any suitable liquid, including human or animal plasma.

BRIEF DESCRIPTION OF THE DRAWINGS

Non-limiting and non-exhaustive embodiments are described with reference to the following figures.

FIGS. 2A and 2B are plan and perspective views of another lyophilization container according to an embodiment of the present application;

FIG. 3A is a plan view of a non-breathable section of a lyophilization container according to an embodiment of the present application;

FIG. 3B is an expanded view of the port region of the non-breathable section of the lyophilization container of FIG. 3A;

DETAILED DESCRIPTION

The principles described in the present application may be further understood by reference to the following detailed description and the embodiments depicted in the accompanying drawings. Although specific features are shown and described below with respect to particular embodiments, the present application is not limited to the specific features or embodiments provided. Moreover, embodiments below may be described with respect to lyophilizing and storing human or animal blood or blood components; however, such descriptions are merely illustrative. Those of skill in the art will appreciate that embodiments of this disclosure may be used in connection with the lyophilization of any suitable liquid.

Embodiments of the present application refer to a closed, sterile container, including sterile fluid pathways, for lyophilizing and storing a fluid, thus obviating the need for a clean room. Moreover, embodiments described in this application may be implemented in conjunction with many conventional, commercially available lyophilizers, such as the EPIC Small Production Lyophilizer by Millrock Technology. Accordingly, the devices and techniques described in this application may be more widely distributed and widely accessible than are existing devices and techniques. Further advantages of the various enumerated embodiments are noted throughout this disclosure.

The terms "multi-part container," "container," "lyophilization container," "multi-part lyophilization container," and the like, are used interchangeably throughout this disclosure. Similarly, the term "breathable," with respect to materials and membranes, may be used interchangeably with the term "semi-permeable." The term "non-breathable" may be used interchangeably with the term "non-permeable."

Figure 1A:
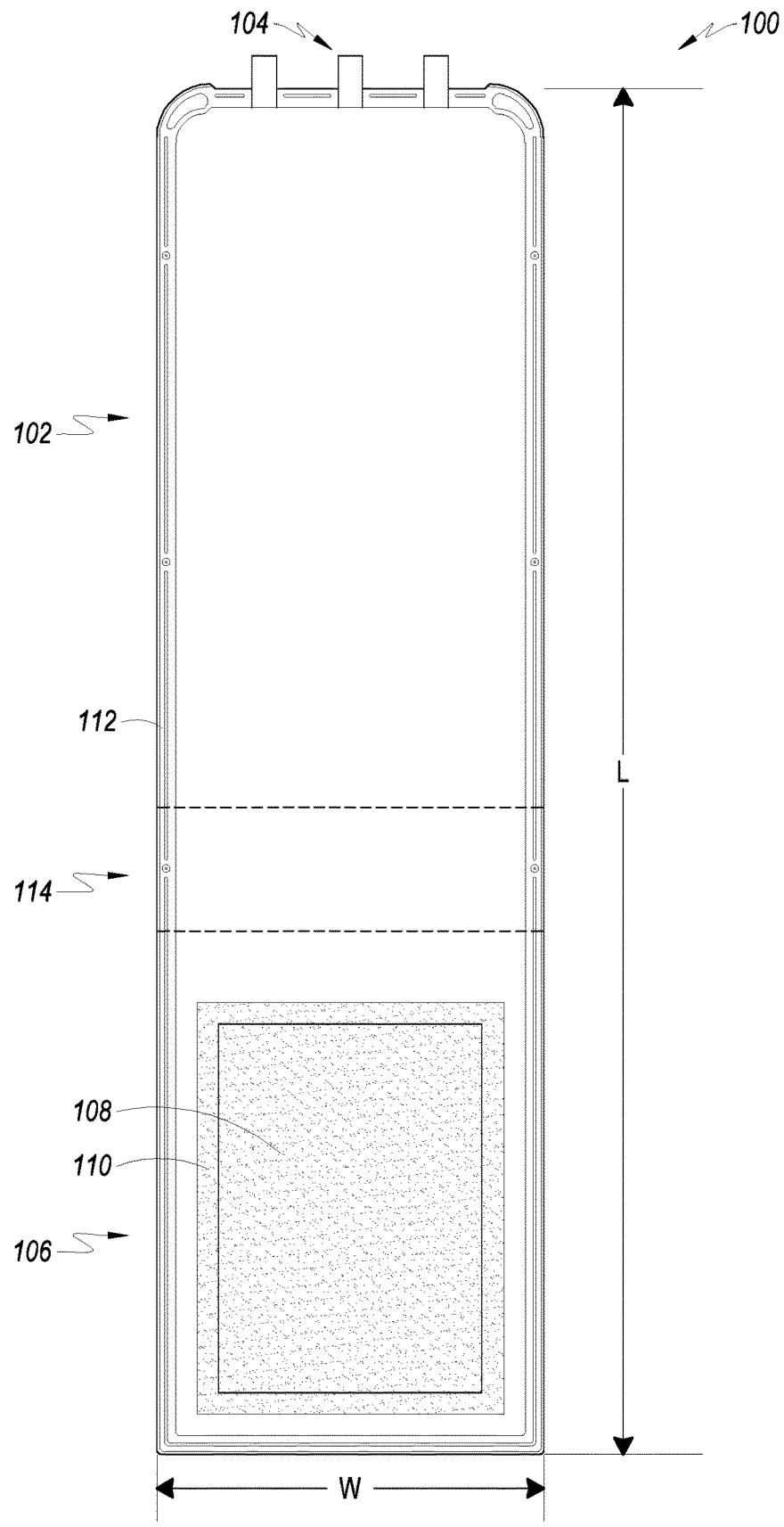
FIGS. 1A and 1B are plan and perspective views of a lyophilization container according to an embodiment of the present application.
Figure 1B:
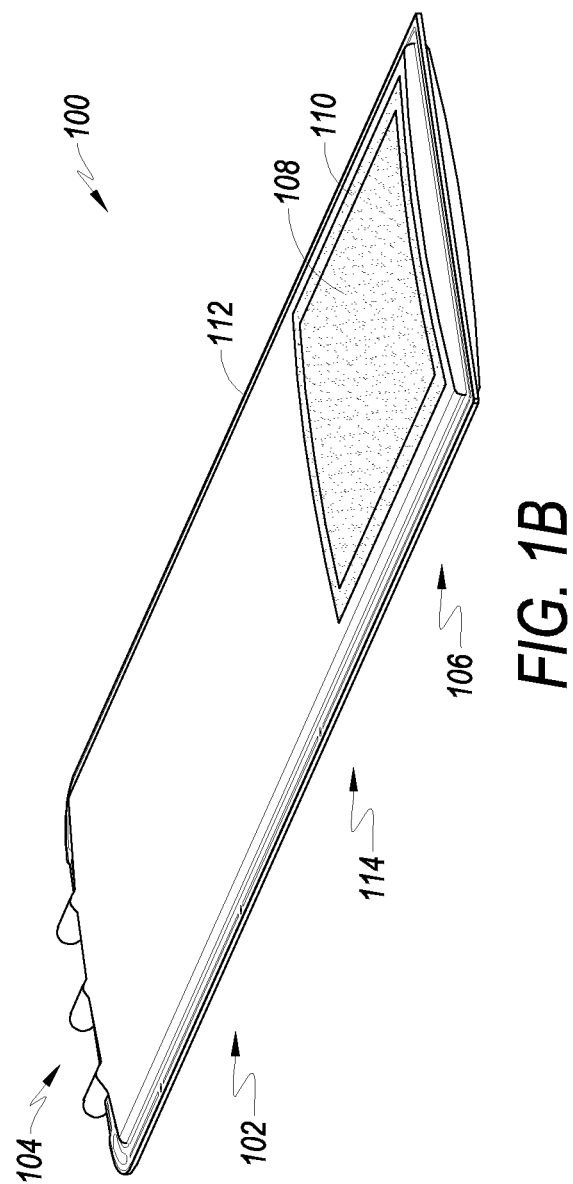

FIGS. 1A and 1B are plan and perspective views of a lyophilization container according to an embodiment of the present application.

Referring to FIG. 1A, the lyophilization container 100 includes a non-breathable section 102, including a port region 104; a breathable section 106, including a breathable membrane 108 and an inner membrane weld 110; an outer perimeter weld 112; and an occlusion zone 114.

As shown in FIGS. 1A and 1B, the lyophilization container 100 is essentially rectangular and is comprised of two principal sections: non-breathable section 102 and breathable section 106, joined in occlusion zone 114. Non-breathable section 102 and breathable section 106 are in communication with one another in a native or normal state, and together encapsulate the container cavity. Port region 104 defines an area within non-breathable section 102 that is configured to incorporate one or more fluidic ports. Breathable membrane 108 is incorporated into breathable section 106 by inner membrane weld 110, which is a sterile seal. Outer perimeter weld 112 is also a sterile seal and defines the outer perimeter of the lyophilization container 100, including the port region 104.

The overall length of the lyophilization container 100, denoted as "L," including both the non-breathable section 102 and the breathable section 106, is approximately 50 cm. In embodiments, L may be any dimension suitable for placement of the container in a shelf lyophilizer or other lyophilizer, any dimension required to increase or decrease vapor flow resistance, or any dimension to increase or decrease the thickness of the frozen liquid, such as between 30 cm and 70 cm, or more preferably between 40 cm and 60 cm. The width of the container, denoted as "W," is approximately 15 cm. In embodiments, W may any suitable dimension, such as between 10 cm and 20 cm, or more preferably, between 13 cm and 17 cm. In the example shown, the length of non-breathable section 106, measured from the midpoint of the occlusion zone, is approximately 28 cm. In embodiments, the length of non-breathable section 106 may any suitable dimension, such as between 20 cm and 40 cm, or more preferably, between 24 cm and 32 cm. The length of breathable section 102, measured from the midpoint of the occlusion zone, is approximately 22 cm. In embodiments, the length of breathable section 106 may any suitable dimension, such as between 10 cm and 30 cm, or more preferably, between 18 cm and 26 cm. The exemplary dimensions of 15 cm by 50 cm described above are suited to lyophilize approximately 300 ml of liquid plasma. The lyophilization of larger or smaller volumes would suggest different preferred dimensions.

Although FIGS. 1A and 1B depict an essentially rectangular container, some embodiments might include geometries that deviate from the rectangular shape. For example, the width of only occlusion zone 114 might be reduced to less than the width W of the embodiment shown. Such an adjustment may result in an essentially hourglass shaped container as opposed to a container having a rectangular shape. This type of adjustment in occlusion zone 114 dimension may better facilitate temporarily sealing of the occlusion zone during the lyophilization process.

The "top" or "front" of the lyophilization container 100 shown is essentially identical to the "bottom" or "back" of the container 100. That is, each of the top and the bottom of the container includes non-breathable material of the non-breathable section and breathable membrane of the breathable section. In alternative embodiments, the breathable membrane comprises a continuous sheet including an isoclinal (i.e., hairpin) fold causing the breathable membrane to bridge a portion of the top or front surface and a portion of the bottom or back surface. In yet another alternative embodiment, the breathable section might comprise breathable membrane only on the top of the container or only on the bottom of the container. In operation, the lyophilization container 100 is typically placed on a lyophilizer shelf such that the bottom or back of the container faces the lyophilizer shelf. That is, during lyophilization, a portion of each of the non-breathable section 102 and the breathable section 106, including breathable membrane, face the lyophilizer shelf. Non-breathable section 102 should be in sufficient direct or indirect thermal communication with the lyophilizer shelf to facilitate conductive and/or radiative heat transfer. In yet further embodiments, only the non-breathable section might be in contact with the shelf and the breathable section might reside off the shelf. In certain other embodiments, the lyophilization container may be disposed vertically within a lyophilization chamber.

In operation, lyophilization container 100 exchanges fluids via ports positioned in the port region 104 of non-breathable section 102. Fluid exchanges occur only during initial filling of the container with liquid plasma and during the post-lyophilization filling of the container with sterile water for reconstitution and transfusion into a patient. Both prior to, and after, the sublimation of the frozen fluid and removal of vapor during lyophilization, non-breathable section 102 and breathable section 106 are isolated from one another by a creation of an occlusion of the container in the occlusion zone 114 encompassing the transition between the non-breathable section 102 and breathable section 106. In this respect, the position of the occlusion within the occlusion zone 114 defines the boundary between non-breathable section 102 and breathable section 106.

Outer perimeter weld 112 defines the outer perimeter of the container and includes port region 104 of the non-breathable section 102. Outer perimeter weld 112 has an average width of approximately 7 mm. In embodiments; however, outer perimeter weld 112 may be any suitable width, such as between 2 mm and 12 mm, and may further be variable by up 3 mm along its length.

Inner membrane weld 110 surrounds the breathable membrane 108 within breathable section 106. Inner membrane weld 110 also has average width of approximately 7 mm; however, in embodiments, inner membrane weld 110 may be any suitable width, such as between 2 mm and 12 mm, variable by up 3 mm along its length.

Port region 104 is the portion of the outer perimeter weld 112 of non-breathable section 102 configured to incorporate one or more fluidic ports capable of forming a sterile fluid pathway between the lyophilization container and any of several other fluid containers. Port region 104 is also configured to facilitate transfusion to a patient.

In addition to encompassing the boundary between non-breathable section 102 and breathable section 106, occlusion zone 114 is adapted to facilitate the evolution of the container throughout its life cycle. Occlusion of the container 100 in the occlusion zone 114 creates a temporary impermeable or substantially impermeable seal, eliminating the fluid communication between the non-breathable section 102 and breathable section 106. In operation, an initial occlusion isolates non-breathable section 102 from the breathable section 106 prior to the introduction of fluid via ports in port region 104. Removal or opening of the occlusion upon formation of a frozen ice structure (i.e., a frozen fluid structure to be lyophilized) allows the container to resume its native state, thus restoring the original container cavity. In the restored state, the container again provides a generous, open pathway for vapor flow between the non-breathable section 102 and breathable section 106. The ability of the container to continually evolve in form and function ensures that no contact occurs between the subject fluid and the breathable section 106 by causing the subject liquid to be isolated and frozen in only the non-breathable section 106 and allowing only the vapor flow from sublimation and desorption to contact the breathable section 106. That is, embodiments of the present application are configured to create a continuous physical separation between the subject liquid and the breathable section 106. Accordingly, the non-breathable section 102 is adapted to accommodate any of a solid, a liquid or a gas, whereas the breathable section 106 is adapted to accommodate only a gas (i.e., a gas only section).

Occlusion zone 114 is approximately 3 cm in width; however, in embodiments, the occlusion zone may be between 1 cm and 5 cm wide, such as between 2 cm and 4 cm wide. The nearest edge of the occlusion zone is preferably positioned within 5 cm of the breathable membrane 108 of the breathable section 106, but may be positioned between 0.2 cm and 10 cm, such as between 3 cm and 7 cm, from the breathable membrane 108. The occlusion zone 114 should be sufficiently proximate to the breathable membrane 108 to ensure the efficient use of container materials and to minimize the distance that vapor must flow to exit the container, yet sufficiently distant from the breathable membrane 108 to allow for the creation of a permanent seam in non-breathable material between the occlusion and the breathable membrane post lyophilization. The creation of a permanent seam in non-breathable material between the occlusion and the breathable membrane material post-lyophilization creates a permanent seal, allowing for a permanent separation of container sections and the removal and disposal of the breathable section 106. Removal of the breathable section 106 is the final step in the evolution of the container. Removal of the breathable section 106 minimizes the volume and the mass of the final product, which is desirable for both transportation and storage. Additionally, removal of breathable section 106 transforms non-breathable section 102 into a more traditional container suitable for fluid transfusion into a patient.

In embodiments, a visual indication may demarcate the occlusion zone 114. For example, the occlusion zone 114 may be indicated by lines, by a color scheme, or by any other conventional means of visual indication. In embodiments, a choice of material or texture may indicate the position of the occlusion zone 114. For example, a textured surface may provide a visual position indication designed to indicate the position and boundaries of the occlusion zone 114. In exemplary embodiments, particular materials or textures may also be chosen for one, or both, of the inner or outer surfaces of container material in the occlusion zone 114 to provide improved sealing characteristics (e.g., smooth materials), to impart an improved ability of the materials to pull apart from one another, or to pull apart from ice formed during freezing of the subject fluid (e.g., textured materials). Notably, materials chosen for the occlusion zone 114 may be textured or smooth and may be like or dissimilar to one another. Material and design choices for the occlusion zone 114 should consider that an intermittent application and removal of an occlusion in the occlusion zone 114 must reliably result in the intermittent creation and removal of a temporary impermeable seal. However, it should be noted that in some circumstances, an occlusion may not be a perfectly impervious or hermetic barrier or seal. That is, in certain situations, minor or insubstantial leakage across an occlusion may be acceptable.

The creation of an occlusion of the container in the occlusion zone 114 may occur by any known means, such as by manual clamping, or by various automated or semi-automated means. Exemplary manual clamps may include, but are not limited to, screw clamps or bag clips that are in common usage. Various automated or semi-automated occlusion means may, for example, include mechanical compression means incorporated into the shelves of, or the shelf system of, a lyophilizer. In all cases, the means chosen for creating an occlusion must ensure that fluids input into the non-breathable section 102 via port region 104 do not contact breathable membrane 108 of breathable section 106 at any point.

In embodiments described throughout this disclosure, various additional features may also be included in non-breathable section 102. For instance, a section of relatively clear container material may be incorporated into non-breathable section 102 to allow visual inspection of the subject fluid before, during or after lyophilization.

In the embodiment shown in FIG. 1, the non-breathable material is ethylene-vinyl acetate (EVA). EVA exhibits several advantageous properties including its relative strength, its relative elasticity and resilience at low temperatures, its relative crack resistance and the ease with which it may be manufactured. EVA also exhibits comparatively favorable thermal transfer properties. Nonetheless, in embodiments, material choices for non-breathable material are not limited, and may include a variety of non-breathable materials that exhibit preferable characteristics, such as thermoplastic elastomers (TPEs). TPEs are relatively soft and flexible, and exhibit advantages for several healthcare applications. For instance, TPEs can be sterilized using autoclaves, gamma irradiation, or ethylene oxide. Further, TPEs can be designed to be biocompatible, to have high purity, and to have low levels of extractable and leachable substances. TPEs are also recyclable and are a comparatively favorable material for cryogenic storage.

Linear, low density polyethylene (LLDPE) may also be desirable for use as non-breathable material. LLDPE is preferable to certain other materials due to its favorable puncture and impact resistance and to its high tensile strength. For instance, as compared to LDPE, LLDPE exhibits superior flexibility and resistance to cracking, thus making it more suitable for certain thin film applications.

Materials selected for non-breathable material must maintain strength at low temperatures (e.g., −40° C. to −60° C.) as is required for lyophilization. Certain materials exhibiting a low surface energy and super-hydrophobicity may further be incorporated into the interior surface of the non-breathable section to facilitate an improved release of the ice structure from the inner surfaces of the container after freezing and before drying.

In embodiments, various additional or alternative plastic films may be incorporated into non-breathable section 102, or to all areas of the container with non-breathable material for a particular purpose or application. For example, materials may be implemented for any of improved impermeability, improved heat sealing characteristics or improved mechanical strength.

Figure 2A:
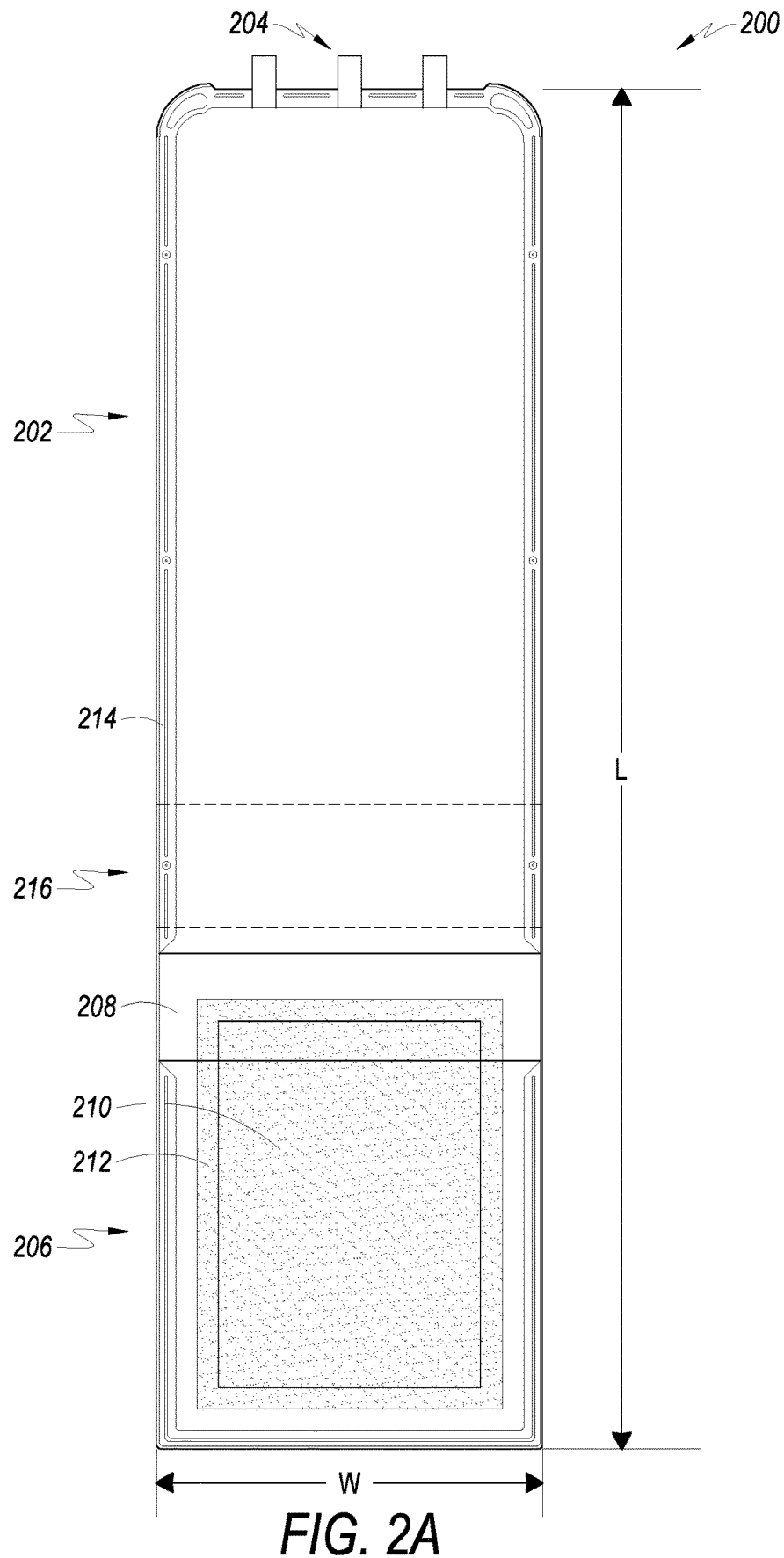

FIGS. 2A and 2B are plan and perspective views of another lyophilization container according to an embodiment of the present application.

Referring to FIGS. 2A and 2B, the lyophilization container 200 includes a non-breathable section 202, including a port region 204; a breathable section 206, including a Hold Open Device (HOD) 208, a breathable membrane 210; an inner membrane weld 212; an outer perimeter weld 214; and an occlusion zone 216.

As shown in FIGS. 2A and 2B, the lyophilization container 200 is essentially the same as the lyophilization container of FIGS. 1A and 1B, further including a Hold Open Device (HOD) 208. In the embodiment shown, HOD 208 is a semi-rigid, flat-sided elliptical fixture, captured within the lyophilization container 200. HOD 208 is in an open mode in its native state, disposed circumferentially within the container cavity to facilitate a pathway for vapor flow between non-breathable section 202 and breathable section 206. HOD 208 is positioned entirely within the breathable section 206, bridging portions of breathable membrane 210 and non-breathable material. Notably, in embodiments, HOD 208 shape is not limited, and various alternative HOD 208 designs may be implemented, such as a modified rectangle or other shape capable of facilitating vapor flow between container sections.

In various embodiments, HOD 208 may be a rigid or a semi-rigid fixture captured within, or fastened to the outside of, the breathable section of the lyophilization container 200. The exact position of the HOD 208 may vary. For example, the HOD 208 may be positioned entirely within the non-breathable section, or within a region of non-breathable material of the breathable section. Alternatively, HOD 208 may extend into portions of both non-breathable material and breathable material. In yet further embodiments, HOD 208 may be positioned and configured to assist in the creation of the temporary seal between bag sections. Preferably, HOD 208 is positioned proximate to the occlusion zone to minimize the distance between the HOD 208 and the placement of an occlusion in the occlusion zone 216. In the example shown, the nearest edge of HOD 208 is positioned approximately 2.5 cm from nearest edge of the occlusion zone 216. Nonetheless, HOD 208 placement may be further optimized according to a particular container 200 or occlusion zone 216 configuration.

FIG. 3A is a plan view of a non-breathable section of a lyophilization container according to an embodiment of the present application.

Referring to FIG. 3A, non-breathable section 300 comprises a non-breathable material 302; and an outer perimeter weld 304, including a port region 306 incorporating fluidic ports 308; and a portion of an occlusion zone 310.

Non-breathable section 300 is comprised of the non-breathable material described above. The boundaries of non-breathable section 300 include outer perimeter weld 304, including port region 306, and the midpoint (i.e., estimated position of occlusion) of the occlusion zone. That is, when the container is occluded in the occlusion zone 310, non-breathable section 300 may be defined as the section of the container on the side of the occlusion that is non-breathable. When an occlusion is not present in the occlusion zone 310, the boundary of the non-breathable section may be approximated as the midpoint of the occlusion zone, as shown ion FIG. 3A.

FIG. 3B is an expanded view of the port region of the non-breathable section of the lyophilization container of FIG. 3A.

Referring to FIG. 3B, port region 306 includes three ports 308. The ports 308 define the manner in which the lyophilization container exchanges fluids with other vessels and containers. The ports 308 must accordingly provide secure, sterile connections which eliminate the potential for breakage, contamination or misconnection, and must function across every phase of use including filling, lyophilization, storage, reconstitution and, in the case of lyophilized plasma, infusion. In embodiments, the configuration and number of ports 308 may vary depending on a particular application. For instance, embodiments may include between 1-5 ports, such as 3 ports. Ports 308 may further include connections which are either resealable or non-resealable.

Ports 308 shown in FIG. 3B may be adapted to include a variety of ports. For example, ports 308 may include any of a spike port, a docking port and a reconstitution port. A spike port may be included to facilitate reinfusion of a reconstituted blood product into a patient. An exemplary spike port may be any weldable spike port known in the art which is compatible for use in lyophilization containers. Examples of suitable materials for use in spike port include polyvinyl chloride (PVC) and ethylene-vinyl acetate (EVA) (e.g., such as is manufactured by Carmo of Denmark). In other embodiments, a polypropylene (PP) spike port may be desirable.

A docking port may be included to connect the lyophilization container with another fluid container, such as a blood pooling container or pooling container set. A docking port may further be used to introduce air or other gas into the lyophilization container. Air or other gas may, for example, be introduced to create a vapor space above the subject liquid or to regulate pH. An exemplary docking port comprises PVC tubing. In embodiments, however, dock port may include any suitable docking fixtures or tubing which are known in the art.

A reconstitution port may be included to accept an inflow of reconstitution fluid into the lyophilization container. An exemplary reconstitution port 308 may include a male or a female Luer-Lock type connection in order to prevent accidental misconnection. One example of such a connection is the Correct Connect® system that is a standardized connection system used in apheresis applications. In embodiments, various one-way valves and other means for providing an error proof connection may also be adapted for use with the reconstitution port 308. Notably, the type of connection used for reconstitution is particularly important. That is, the handling of reconstitution fluids entails the potential risk of a direct transfusion of the reconstitution fluid into the patient. Such an event constitutes a serious and immediate health hazard. For this reason, it is important that the reconstitution port and related connections be highly conspicuous and be incompatible with the other ports in order to avoid an occurrence of accidental misconnection.

Figure 4:
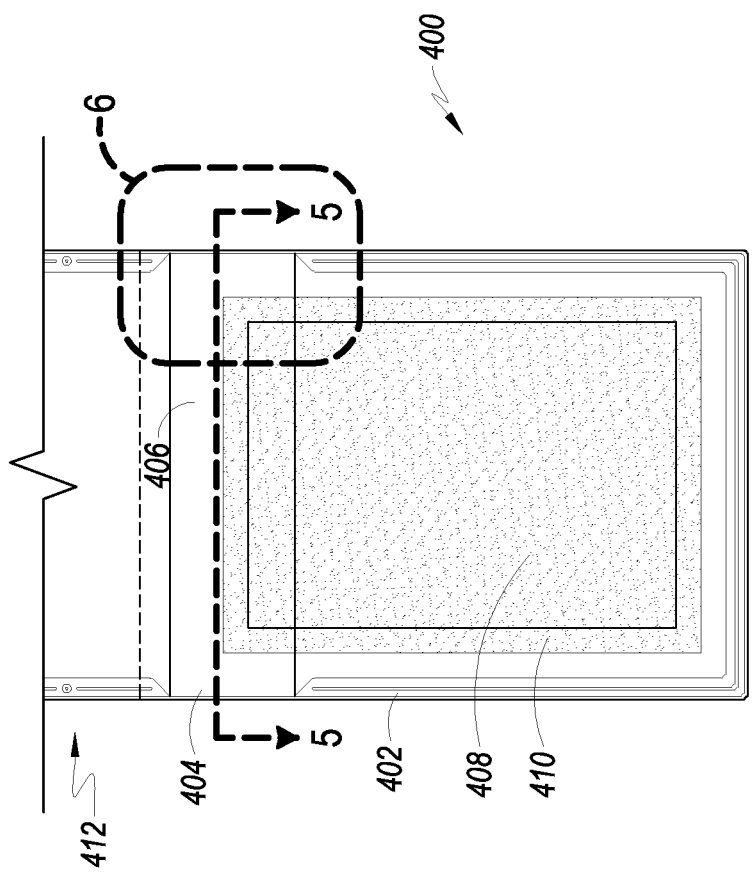
FIG. 4 is a plan view of a breathable section of a lyophilization container according to an embodiment of the present application.

FIG. 4 is a plan view of a breathable section of a lyophilization container according to an embodiment of the present application.

Referring to FIG. 4, breathable section 400 comprises an outer perimeter weld 402, including a Hold Open Device (HOD) capture void 404; a HOD 406; a breathable membrane 408; an inner membrane weld 410; and a portion of an occlusion zone 412.

The boundaries of breathable section 400 include outer perimeter weld 402 and the midpoint (i.e., estimated position of occlusion) of the occlusion zone 412. That is, when the container is occluded in the occlusion zone 412, breathable section 400 may be defined as the section of the container on the side of the occlusion that is breathable. When an occlusion is not present in the occlusion zone 412, the boundary of the breathable section 400 may be approximated as the midpoint of the occlusion zone, as shown in FIG. 4.

Breathable section 400 comprises breathable membrane 408 embedded within non-breathable material. Inner membrane weld 410 is a sterile seal defining the boundary between the breathable membrane and non-breathable material. Outer perimeter weld 402 is a sterile seal defining the outer perimeter of breathable section 400. Outer perimeter weld 402 includes HOD capture voids 404 for capturing HOD 406 within the container.

In certain embodiments, breathable membrane 408 may comprise only one material. In other embodiments, breathable membrane 408 may comprise two or more materials, for example, breathable membrane may comprise a membrane laminate consisting of a breathable membrane and a backing material. In embodiments comprising a laminate, membrane material may include an expanded polytetrafluoroethylene (PTFE). PTFE membranes are preferable to other membranes for several reasons. For instance, expanded PTFE provides a microstructure that may be precisely controlled, which results in the ability to obtain a desired a pore size distribution. Further, expanded PTFE is essentially inert, is operable across a large temperature range and can withstand harsh environments. For at least these reasons, expanded PTFE provides characteristics which are preferable in comparison to other materials.

An ideal pore size for an expanded PTFE membrane may be between 0.1 micron (µm) to 0.5 µm, such as 0.15 µm to 0.45 µm, or 0.2 µm to 0.3 µm. A PTFE membrane having pore sizes in this range exhibits relatively efficient vapor transmission characteristics while maintaining a sterile barrier capable of eliminating the ingress of contaminants.

A reinforcing material is designed to bond the breathable section 400 to the non-breathable section without impairing the functionality of the breathable membrane 406. The addition of a reinforcing material improves the structural integrity of the container. That is, the reinforcing material must bond with the breathable membrane, must bond with the non-breathable material, and must have a pore size that does not impede vapor transmission across the breathable membrane during lyophilization. Exemplary reinforcing materials are preferably a 50:50 polypropylene/polyethylene blend. In embodiments, however, preferable blend ratios may vary and may be between 40:60 and 60:40 polypropylene:polyethylene. Polypropylene backing materials are advantageous, inter alia, for their transition glass temperatures which are low enough to avoid material degradation during freezing at lyophilization temperatures, such as −40° C.

In embodiments comprising a laminate, various additional or alternative plastic films may be incorporated into the breathable membrane or to the backing material to impart desired characteristics, such as favorable heat sealing characteristics, improved permeability, or for overall mechanical strength.

Figure 5:
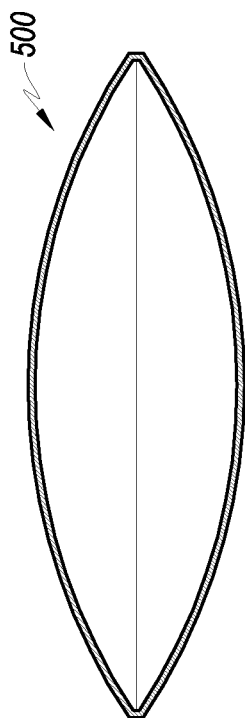
FIG. 5 is a section view of the Hold Open Device (HOD) of the breathable section of the lyophilization container of FIG. 4.

FIG. 5 is a section view of the Hold Open Device (HOD) of the embodiment shown in FIG. 4.

Referring to FIG. 5, HOD 500 is a semi-rigid fixture having an essentially ovular or elliptic shape incorporating pointed ends and flat sides. In the embodiment shown, HOD 500 is captured within the breathable section proximate to the occlusion zone. In other embodiments, the HOD 500 may be coupled to the outside of the container. Although generally the HOD 500 is designed to reside in, or on the outside of, the breathable section of the container, physically separated from the subject liquid throughout the container life cycle, various further embodiments could include HOD 500 in the non-breathable section.

Incorporation of the elliptic HOD 500 creates a generous open region above a thin, uniform structure of ice. Preferably, the thin, uniform ice structure has a thickness of from 6 mm to 13 mm, such as 10 mm, to maximize the efficacy and efficiency of the container. Incorporating the HOD 500 assists in securing a generous vapor pathway between the non-breathable section and the breathable section and reduces overall vapor pressure in the container during sublimation. HOD 500 may also compliment the intermittent creation of occlusions (i.e., temporary impermeable or substantially impermeable seals) in the occlusion zone. For example, HOD 500 may impart a tautness to container material which improves the reliability or quality of an occlusion. HOD 500 may likewise assist in the pulling apart of occlusion zone surfaces throughout the removal of the occlusion, thereby facilitating a re-creation of the vapor pathway between container sections. The pulling apart of occlusion zone surfaces can be complicated by the existence of ice formed on, or directly adjacent to, the occlusion as a result of an inadvertent wetting of occlusion zone materials by the subject fluid prior to the freezing step. Such wetting may be caused during the filling step, or by movement of the container. In this respect, HOD may compliment other means employed to address problems associated with the pulling apart of occlusion zone surfaces described herein, including material and related texture choices.

In the embodiment shown, HOD 500 comprises a semi-rigid silicone. In embodiments, however, several other rigid or semi-rigid materials may be implemented. For example, PVC or certain other synthetic plastic polymers may be preferable HOD 500 material. In certain embodiments, semi-rigid materials may be incorporated for their ability to flex in response to an occlusion of the occlusion zone. In such embodiments, HOD may compress to some degree upon occlusion of the occlusion zone, and may rebound toward an original shape upon removal of the occlusion. Such shape-memory behavior may assist in the maintaining of an open region above the subject liquid or ice and in the creation of generous vapor pathway between container sections. This may be especially pronounced in embodiments combining a semi-rigid HOD with other flexible container materials.

The external height of HOD 500 shown in FIG. 5 is 2.8 cm; however, in embodiments, external height may vary from 1.5 cm to 4 cm. The internal height is approximately 2.2 mm; however, in embodiments, the internal height may vary between 1 cm to 3 cm depending on the exact configuration and size of HOD. HOD width is the approximate width of the lyophilization container. HOD 500 depth is approximately 3.5 cm; however, in embodiments HOD depth may be between 0.5 cm and 4 cm. The overall size and shape of HOD 500 is not limited, and accordingly may vary depending on the desired configuration of a particular embodiment.

Figure 6:
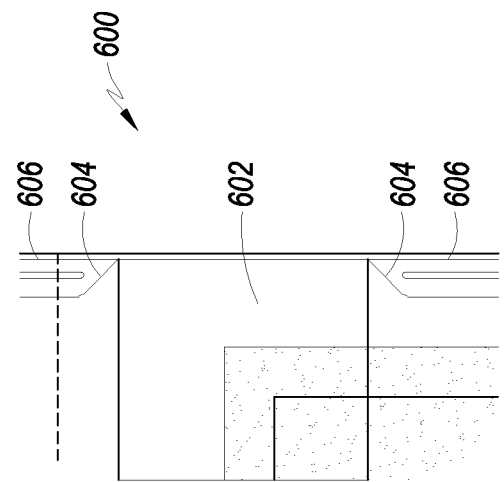
FIG. 6 is an expanded view of the HOD capture void of the breathable section of the lyophilization container of FIG. 4.

FIG. 6 is an expanded view of the Hold Open Device (HOD) capture void of the breathable section of the lyophilization container of FIG. 4.

Referring to FIG. 6, HOD capture void 600 includes a void space 602, sidewalls 604 and outer perimeter weld 606.

HOD capture void 600 is essentially an indentation or a void within outer perimeter weld 606 in which the HOD is securely captured. As shown, the void space 602 has a width which is slightly larger than the width of the HOD to accommodate the HOD. Sidewalls 604 are angled at approximately 45 degrees to the longitudinal axis of the outer perimeter weld. Void space 602 depth is approximately 4 mm.

In embodiments, each of the parameters of the HOD capture void 600 can be optimized. For instance, HOD void space 602 width may vary according to a particular container configuration and may be as much as 20 percent greater than the width of the HOD. Likewise, HOD void space 602 depth may vary. For example, HOD void space 602 depth may be between 1 mm and 6 mm, such as between 2 mm and 4 mm.

In embodiments, the design of HOD capture void 600 may also vary. For instance, sidewall 604 angle may be lesser or greater than 45 degrees. In some cases, the sidewalls 604 may be perpendicular to the longitudinal axis of the outer perimeter weld 606. In further embodiments, sidewall 604 angles may be dissimilar. Likewise, HOD void space 602 depth may vary along its length. That is, in embodiments, HOD capture void 600 may be asymmetrical or irregular.

Figure 7:
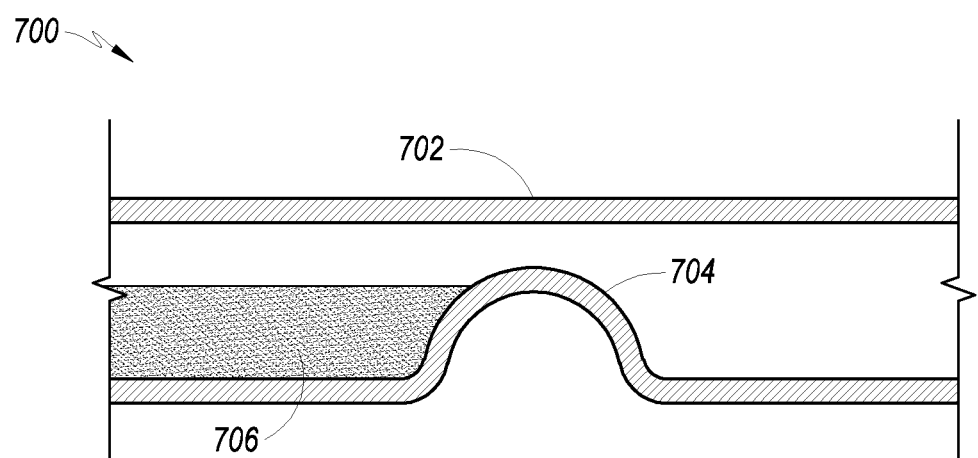
FIG. 7 is a side section view of an alternative configuration of an occlusion zone according to an embodiment of the present application.

FIG. 7 is a side section view of an alternative configuration of an occlusion zone according to an embodiment of the present application.

Referring to FIG. 7, occlusion zone 700 includes top material 702; dam 704; and a liquid 706.

In the embodiment shown in FIG. 7, occlusion zone 700 is incorporated into a lyophilization container disposed horizontally on a lyophilizer shelf. Top material 702 of occlusion zone 700 comprises non-breathable material and is positioned opposite the container cavity from dam 704. Dam 704 is a rigid or semi-rigid container feature capable of maintaining a segregation of the liquid 706 input to the non-breathable section. Dam 704 height measured from the shelf of the lyophilizer can be any height which exceeds the height of liquid input into non-breathable section. In this respect, dam 704 prohibits the flow of fluid from non-breathable section into breathable section, as shown in FIG. 7.

Dam 704 shown in FIG. 7 comprises a dome shape; however, in embodiments, other dam designs may be desirable. For instance, dam designs including a flat top, or dam designs configured to cooperate with a particular occlusion device or member (not shown) may be desirable. Similarly, textured materials may be included in dam designs to assist in the creation of a temporary impermeable seal during occlusion. In yet further embodiments, dam features may be incorporated into a lyophilization container designed to hang vertically. In embodiments, a dam may be included on one or both sides of an occlusion zone to maintain a segregation of the fluid input into the non-breathable section.

As noted, embodiments of the lyophilization container(s) described herein are configured to continually evolve as the lyophilization process moves through its cycle. Exemplary workflows included below describe the manner in which container embodiments may be manipulated to accomplish container evolution.

Figure 8:
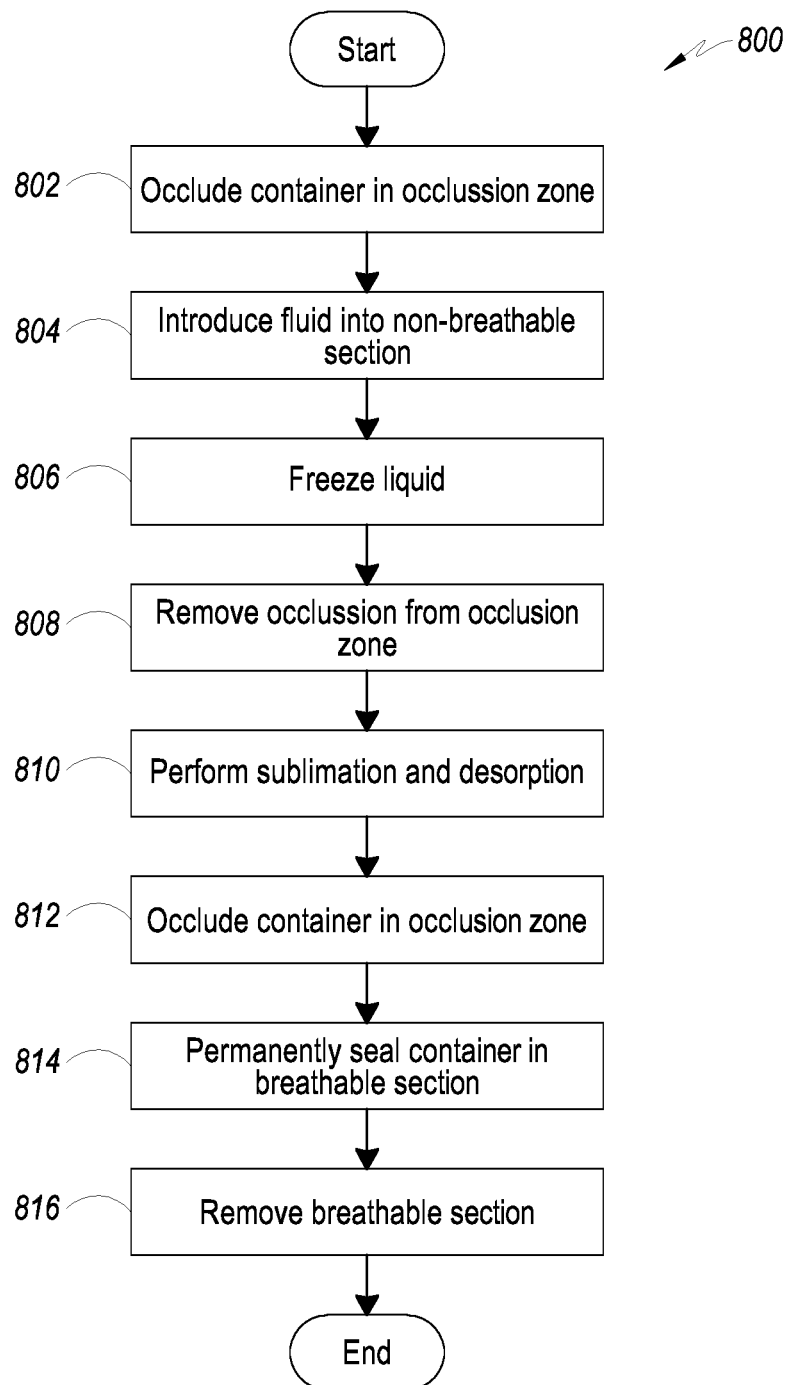
FIG. 8 is a workflow schematic illustrating an intermittent occlusion of a lyophilization container according to an embodiment of the present application.

FIG. 8 is a workflow schematic illustrating an intermittent occlusion of a lyophilization container according to an embodiment of the present application.

Referring to FIG. 8, in step 802, an occlusion is created in the occlusion zone. In step 804, a subject fluid (e.g., blood plasma) is introduced into the non-breathable section through a port in the port region (e.g., a docking port). In step 806, the liquid in the container is frozen, creating a thin, uniformly thick structure of ice in the non-breathable section. In step 808, the occlusion is removed (i.e., the temporary seal is opened) from the occlusion zone. In step 810, vacuum and heat energy are applied to accomplish sublimation and desorption, causing a phase change in the ice structure from the solid phase directly to the vapor phase. Vapor released from the ice structure flows through the container cavity via the unoccluded occlusion zone and escapes through the breathable section, leaving the lyophilized plasma cake (i.e., the ice structure now dehydrated as a result of lyophilization) in the non-breathable section. In step 812, the container is again occluded in the occlusion zone to prevent contamination of the lyophilizate with moisture and oxygen from air. In step 814, a permanent seam is created in non-breathable material of the breathable section between the occlusion and the HOD. In step 816, the container is divided at the permanent seam and the breathable section is discarded, leaving the lyophilizate in the non-breathable section which has now evolved into its final form as a medical infusion bag.

In step 804, the introduction of fluid may be referred to as pre-loading. During preloading, between 250 ml to 500 ml of fluid (e.g., blood plasma) are input into the non-breathable section of the multi-part lyophilization container. The container is then placed horizontally on the shelf of a lyophilizer, "front" or "top" side upward facing.

In step 810, sublimation and desorption include the application of heat energy and vacuum. Preferable drying temperatures may range from −20° C. to −40° C., such as −25° C. Owing to the generous vapor pathway between container sections and the large surface area of breathable membrane in the breathable section, vapor from the ice structure escapes relatively freely from the container. This, in turn, results colder temperatures during lyophilization and therefore improved quality of the final dry product. In addition, a diminution in sublimation times as compared to conventional lyophilization techniques is realized. Further, embodiments result in reduced vapor pressures in, and an increase in mass transfer across, the breathable section, which may result in a sufficient drying of the ice structure solely during a single drying phase. That is, embodiments may obviate the need for the secondary drying phase of traditional 2-phase drying methods (i.e., desorption).

In step 812, an occlusion is made in the occlusion zone of the container, creating a temporary seal between the breathable section and the non-breathable section.

In step 814, a permanent seam is created, isolating the lyophilized cake in the non-breathable section. In the schematic shown, permanent seam step 814 is a discreet step. That is, an ancillary piece of equipment is used to create the permanent seam or seal. In further examples, permanent seam step 814 may be integrated into occlusion step 812. In such embodiments, the occlusion means (e.g., a clamp) may incorporate the permanent sealing means.

In step 816, the complete removal of the breathable section represents the final evolution of the container. Removal of the breathable section eliminates the potential for moisture and oxygen ingress into the dried product, thereby increasing shelf life and plasma stability. Additionally, the reduced size of the final lyophilizate container is more convenient for each of transportation, storage, reconstitution and infusion.

In further exemplary workflows, steps may be added to the workflow described in FIG. 8. For example, additional steps may include the introduction of gas into the lyophilization container to regulate pH or to create a vapor space above the subject fluid or ice structure. In a further example, an additional step may include backfilling the lyophilization container with an inert gas to regulate container pressure.

Figure 9:
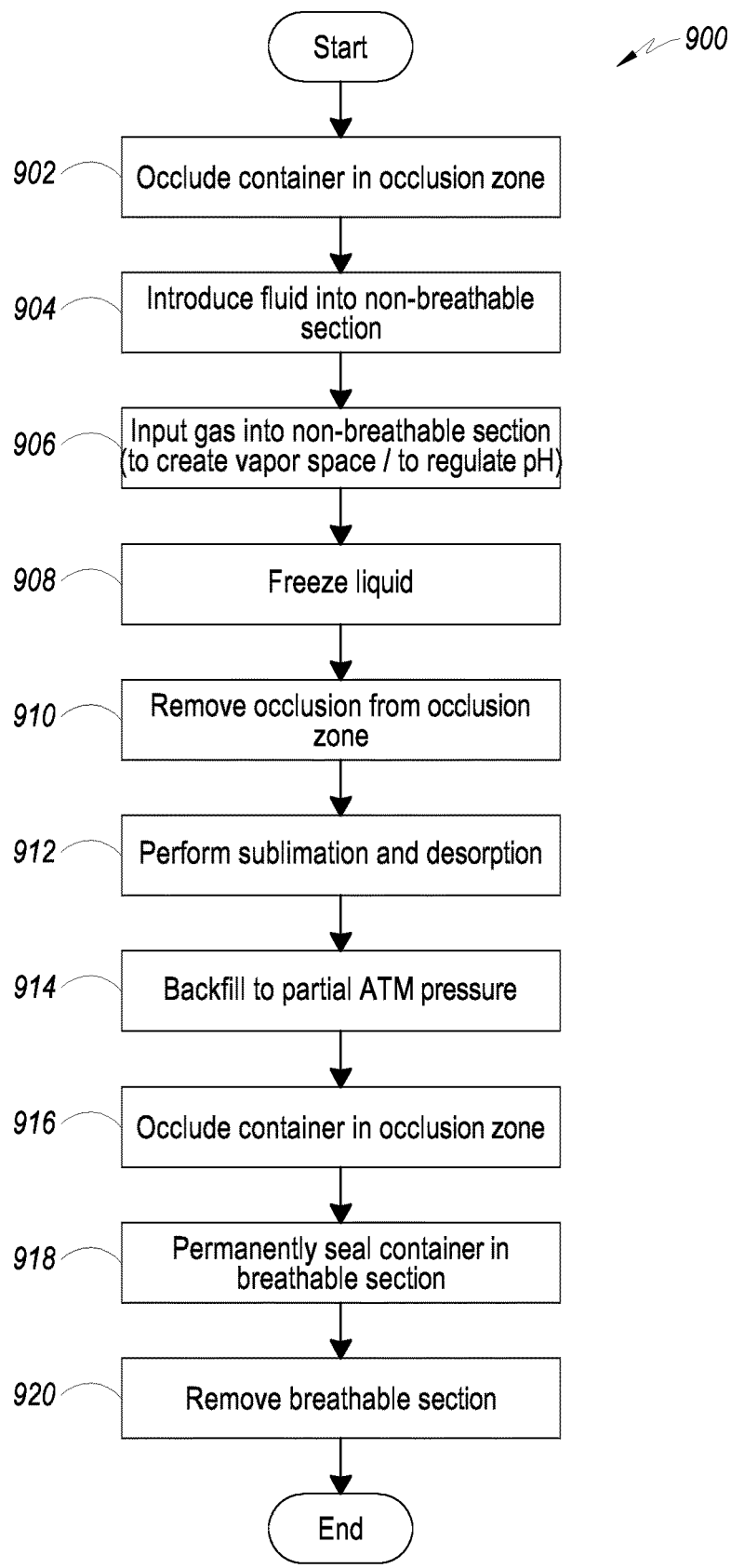
FIG. 9 is workflow schematic illustrating an intermittent occlusion of a lyophilization container according to another embodiment of the present application.

FIG. 9 is workflow schematic illustrating an intermittent occlusion of a lyophilization container according to another embodiment of the present application.

Referring to FIG. 9, in step 902, an occlusion is created in the occlusion zone. In step 904, a subject fluid (e.g., blood plasma) is introduced into the non-breathable section through a port in the port region (e.g., a docking port). In step 906, air, inert gas, or a pH regulating gas (e.g., $CO_2$) is introduced into the non-breathable section through a port in the port region (e.g., a docking port). In step 908, the liquid in the container is frozen, creating a thin, uniformly thick structure of ice in the non-breathable section. In step 910, the occlusion is removed from the occlusion zone. In step 912, vacuum and heat energy are applied to accomplish sublimation and desorption, causing a phase change in the ice structure from the solid phase directly to the vapor phase. Vapor released from the ice structure flows through the container cavity via the unoccluded occlusion zone and escapes through the breathable section, leaving the lyophilized plasma cake in the non-breathable section. In step 914, the container is backfilled with an inert gas to raise container pressure to partial atmospheric pressure. In step 916, the container is occluded in the occlusion zone to prevent contamination of the lyophilizate. In step 918, a permanent seam is created in the non-breathable material of the breathable section between the occlusion and the HOD. In step 920, the container is divided at the permanent seam and the breathable section is discarded, leaving the lyophilized end-product in the non-breathable section.

FIG. 9 essentially represents a departure from the workflow of FIG. 8 only in the addition of steps 906 and 914. In step 906, air (or nitrogen or another inert dry gas), or a pH regulating gas (e.g., $CO_2$) is introduced into the lyophilization container. Air can be introduced to create a generous physical separation, i.e., a vapor space, between the container material and the preloaded fluid. In exemplary embodiments, the introduction of a vapor space may cause container pressure to reach between 0.3 Pound per square inch (Psi) and 1.0 Psi, such as 0.5 Psi (approximately 26 mmHG). Advantageously, the creation of a vapor space in the container reduces the amount of ice "sticking" to the container material during and after the freezing step. A pH-regulating gas may be introduced to the lyophilization container to regulate pH. In an alternate embodiment, a pH-regulating gas might be introduced during step 914 described below.

In step 914, the lyophilization container is backfilled to partial atmospheric pressure with pH regulating gas (e.g., $CO_2$). In exemplary embodiments, backfill pressure is 65 Torr (or 65 mmHG) absolute pressure. In embodiments, backfill pressure may range from between 40 mmHG and 90 mmHG, such as between 60 mmHG and 70 mmHG. Once at partial atmospheric pressure, the container is occluded, and then permanently sealed in steps 916 and 918, respectively. Occlusion and/or sealing of the container while at a pressure lower than atmospheric pressure causes the container to collapse and reduce its volume when the container is exposed to atmospheric pressure. This process also secures the pH regulating gas in the non-breathable portion and prevents an ingress of oxygen and moisture into the container. Since the resultant container has been occluded and/or sealed at a pressure that is less than atmospheric pressure, and since final container volume will be in a reduced volume condition once the vacuum of the lyophilizer is removed, the final lyophilized product can be stored and transported more easily. Backfilling in this manner is particularly applicable to container embodiments having flexible materials or components since such a diminution of container volume would not be possible with a rigid, inflexible lyophilization container.

In the workflows described above, the means for creating the occlusion are not limited. For example, occlusion means may be integrated into the flexible container, or may be a reusable piece of equipment external to the container. In all embodiments, occlusion means must be capable of creating a temporary impermeable or substantially impermeable seal between the non-breathable section and the breathable section of the evolving multi-part lyophilization container.

The use of a physical barrier (e.g., a clamp) to segregate fluid in the non-breathable section from the breathable section according to workflows described above eliminates the potential for fluid contact with, and fouling of, the pores of breathable material in the breathable section. Fouling can disrupt the sublimation and desorption aspects of lyophilization, thereby increasing total lyophilization time and reducing the ability to obtain a viable lyophilizate. Accordingly, eliminating the potential for fouling leads to a relative increase in vapor flow which, in turn, results in faster freeze drying, a colder ice temperature during primary drying due to an increased sublimative cooling effect and increased retention of proteins and clotting factors.

Moreover, because the lyophilization container is a closed, sterile system including sterile fluid pathways, embodiments enable lyophilization to occur in both non-sterile environments and in remote locations. In this respect, for example, embodiments allow lyophilization to be performed on-site at an ordinary blood center as opposed to a traditional clean room facility. Container embodiments also allow flexibility for an operator to freeze and maintain a frozen inventory of plasma in a standard freezer, such as that found in typical blood bank settings. At a later time, this previously frozen plasma can be moved to the more specialized lyophilization instrument for sublimation and desorption. Such work flow flexibility results in improved blood logistics and work flow within the blood bank.

A further advantage of embodiments described herein is the ability to remove the non-breathable section of the lyophilization container post-lyophilization. Isolation and removal of the breathable section post-lyophilization results in the creation of a smaller, lighter aseptic container enclosing the final lyophilizate. The resultant container is also both flexible and highly portable. Moreover, since the breathable section is most vulnerable to moisture and oxygen ingress, its removal can be said to improve the shelf stability of the lyophilizate. The novel use of a temporary occlusion described herein makes this advantage possible. That is, in conventional systems utilizing glass containers, a stopper is mechanically applied to a glass lyophilization container prior to the opening of the lyophilizer in order to prevent an ingress of moisture and oxygen into the container. In contrast, present embodiments utilize the temporary occlusion to prevent an ingress of moisture and oxygen into the non-breathable portion of the container until a permanent seal can be made between non-breathable material portions of the front and back of the container.

The ability of embodiments herein to evolve container configuration, yet to remain a closed, sterile system throughout each phase of container lifecycle is highly unique and advantageous in the lyophilization space. That is, the present embodiments evolve to achieve significant advantages over conventional devices and methods during each of filling, lyophilization, transportation, storage, reconstitution and infusion. Accordingly, many of the attributes and advantages described herein are not possible using conventional devices and approaches, which do not evolve and which require a clean room environment. Importantly in this regard, the evolving, multi-part containers described herein should be further considered evolving, multi-function containers insofar as the type and arrangement of container elements allow the container to accomplish various functions throughout its lifecycle.

Notwithstanding the various specific embodiments enumerated in this disclosure, those skilled in the art will appreciate that a variety of modifications and optimizations could be implemented for particular applications. Additionally, the present application is not limited to the lyophilization of blood or blood products. That is, the principles of the present application may be applicable to the lyophilization of many fluids. Accordingly, various modifications and changes may be made in the arrangement, operation, and details of the methods and systems of the present application which will be apparent to those skilled in the art.

What is claimed is:

1. A multi-part lyophilization container, the container comprising:
    a front surface;
    a back surface;
    a non-breathable section including a port region;
    a breathable section including a breathable membrane; and
    an occlusion zone encompassing a boundary bridging the non-breathable section and the breathable section,
    wherein the non-breathable section and the breathable section are disposed on opposite sides of the occlusion zone.
2. The container of claim 1, wherein the front surface and the back surface each comprise a portion of breathable section including a breathable membrane.
3. The container of claim 1, wherein the breathable membrane comprises a continuous sheet including an isoclinal fold allowing the breathable membrane to bridge a portion of the front surface and a portion of the back surface.
4. The container of claim 1, wherein the occlusion zone comprises material that is the same as non-breathable material of the non-breathable section.
5. The container of claim 4, wherein the occlusion zone comprises at least two dissimilar materials positioned opposite one another across a space formed between the front surface and the back surface of the container.
6. The container of claim 1, wherein the occlusion zone comprises a visual indicator.
7. The container of claim 1, further comprising a Hold Open Device (HOD).
8. The container of claim 7, wherein the HOD comprises a semi-rigid material.
9. The container of claim 7, wherein the HOD comprises a rigid material.
10. The container of claim 9, further comprising HOD capture voids formed in an outer perimeter weld thereof, within which the HOD is captured.
11. The container of claim 7, wherein the HOD is coupled to the outside of the container.
12. The container of claim 1, wherein the non-breathable section comprises polyethylene.
13. The container of claim 12, wherein the polyethylene is a linear, low density polyethylene.
14. The container of claim 1, wherein the breathable membrane comprises at least two layers.
15. The container of claim 14, wherein the at least two layers of the breathable membrane comprise a breathable membrane and a reinforcing material.
16. The container of claim 15, wherein the breathable membrane is hydrophobic.
17. The container of claim 15, wherein the breathable membrane is an expanded polytetrafluoroethylene (PTFE).
18. The container of claim 15, wherein the reinforcing material is a polypropylene/polyethylene blend.

19. The container of claim 1, wherein the ratio of the surface area of the non-breathable section to the surface area of the breathable section is between 5:2 and 5:3.

20. A method of lyophilizing a fluid in a multi-part container, the method comprising:
- creating a temporary seal in an occlusion zone dividing a non-breathable section of the container from a breathable section of the container;
- inputting a fluid into the non-breathable section of the container;
- freezing the fluid;
- opening the temporary seal to allow vapor transfer between the non-breathable section of the container and the breathable section of the container; and
- adding heat energy to the frozen fluid under vacuum,
- wherein the non-breathable section and the breathable section are disposed on opposite sides of the occlusion zone.

21. The method of claim 20, further comprising inputting a gas into the non-breathable section of the container to create a vapor space above the inputted fluid.

22. The method of claim 20, further comprising inputting a pH-regulating gas into the non-breathable section of the container to regulate pH.

23. The method of claim 20, further comprising backfilling a lyophilization chamber to a partial atmospheric pressure.

24. The method of claim 23, wherein the backfilling of the lyophilization chamber to a partial atmospheric pressure is performed using a pH regulating gas.

25. The method of claim 24, further comprising occluding the container in the occlusion zone.

26. The method of claim 25, further comprising forming a permanent seam in the breathable section of the container while the interior of the non-breathable section is at partial atmospheric pressure.

27. The method of claim 26, further comprising introducing an inert gas to raise chamber pressure to atmospheric pressure.

28. The method of claim 27, further comprising removing the breathable section of the flexible container.

* * * * *